United States Patent

[11] 3,592,350

| [72] | Inventors | Guido Martelli<br>Piazza XX Settembre 5;<br>Nerio Martelli, Via Cavaioni 6; Francesco<br>Martelli, Piazza XX Settembre 5, all of<br>Bologna, Italy |
|---|---|---|
| [21] | Appl. No. | 820,368 |
| [22] | Filed | Apr. 30, 1969 |
| [45] | Patented | July 13, 1971 |
| [32] | Priority | May 8, 1968 |
| [33] | | Italy |
| [31] | | 7,010 A/68 |

[54] MOLDED-PLASTIC CARTONS FOR THE PACKAGING OF SMALL FRAGILE OR FLABBY FILLED SEALED CONTAINERS SUCH AS BOTTLES AND THE LIKE
6 Claims, 3 Drawing Figs.

[52] U.S. Cl. .................................................. 217/19,
229/2.5, 217/26.5
[51] Int. Cl. .................................................. B65d 25/02,
B65d 81/00

[50] Field of Search .................................................. 217/18, 19,
22, 30, 26.5; 229/27, 15, 29 D, 29 M, 42; 220/2, 5,
21, 22

[56] References Cited
UNITED STATES PATENTS

| 3,056,523 | 10/1962 | Aeifers .......................... | 217/27 |
| 3,300,076 | 1/1967 | Wohl ............................. | 229/15 X |

Primary Examiner—Raphael H. Schwartz
Attorney—Edwin E. Greigg

ABSTRACT: Cellular cartons to be inserted in packaging boxes, for the packaging of bottles and manufactured by molding of thermoplastic material have peripheral cells provided with bottom sheets on which the bottles rest and inner cells having their lower ends permitting the through passing of the bottle ends, whose bottoms rest upon the bottom of the packaging box. The bottles inserted in the peripheral cells serve for anchoring the cartons in the packaging boxes.

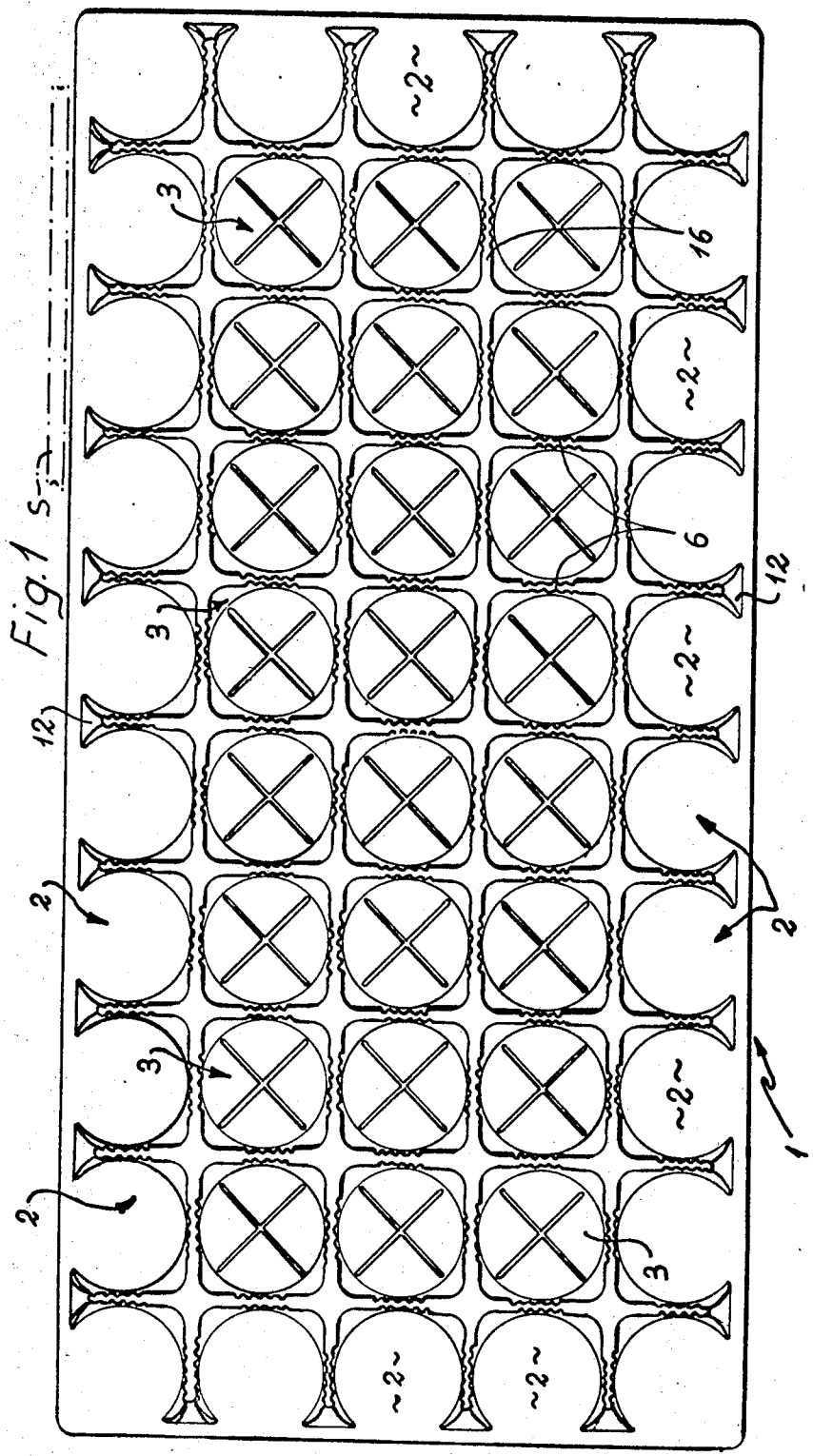

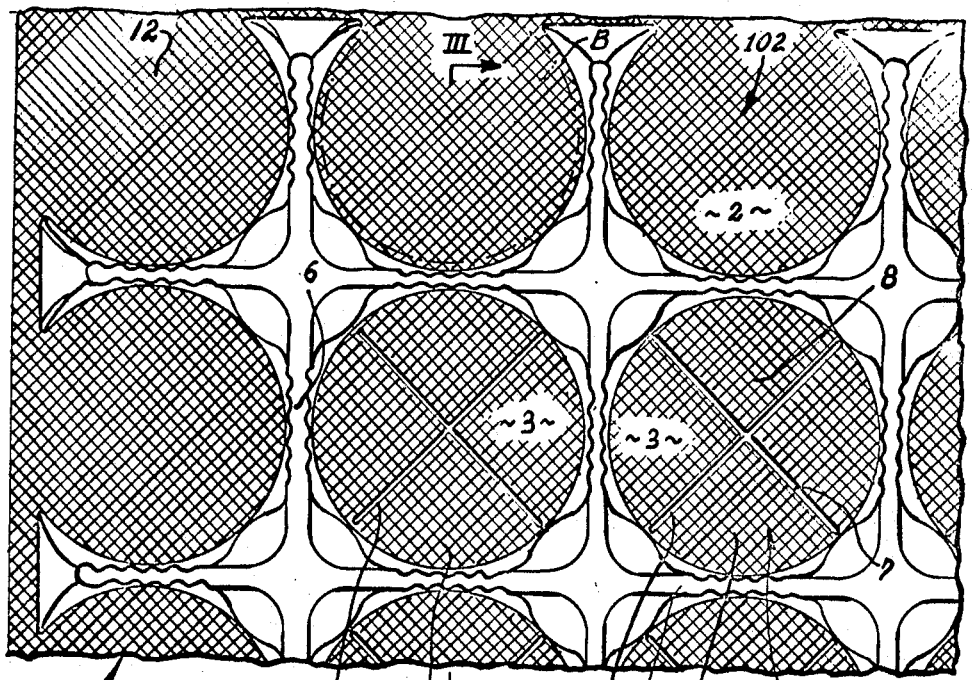
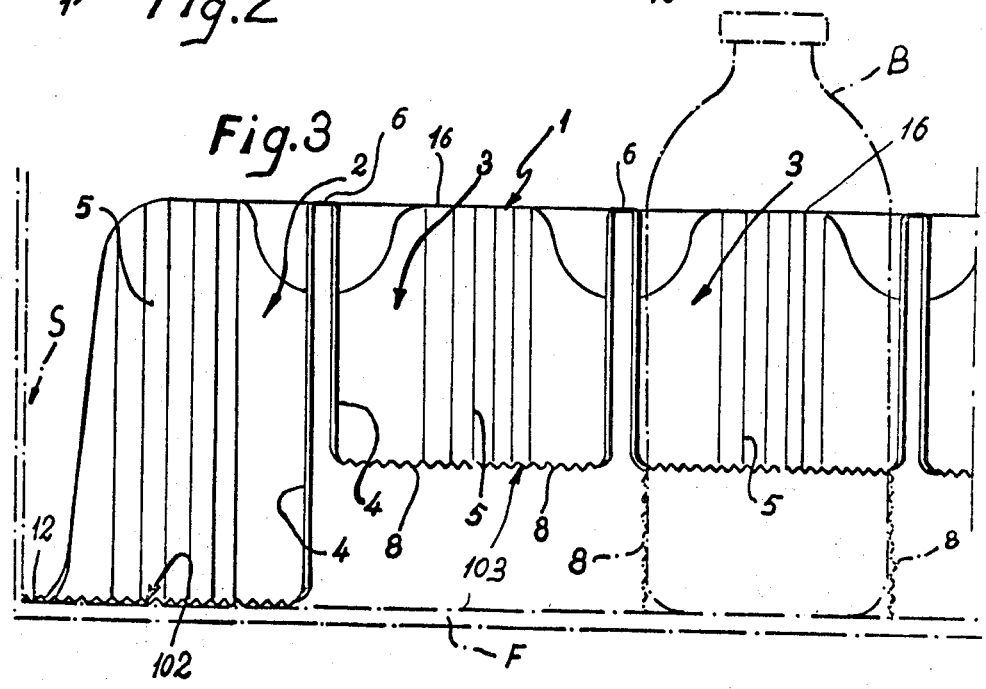

MOLDED-PLASTIC CARTONS FOR THE PACKAGING OF SMALL FRAGILE OR FLABBY FILLED SEALED CONTAINERS SUCH AS BOTTLES AND THE LIKE

This invention relates to the packaging of small fragile or flabby articles and particularly of filled and sealed small bottles or tumblerlike containers, (the term "small" being employed to indicate bottles or containers having a capacity of usually not over 250 cubic centimeters) such as beverage bottles, fruit juice bottles, sample bottles, yaourt containers and the like, and which, for simplicity, shall be called hereinafter "bottles."

The object of the invention is to provide so-called "cellular cartons" made from integral molded thermoplastic sheets and adapted to be inserted into packaging boxes made of cardboard, wood or plastic material.

The plastic "cellular cartons" according to the invention are designed for rapidly packaging in boxes said fragile or flabby small filled and sealed containers or "bottles" so that they are maintained separate in their packaging boxes, during even a rough handling, said cellular cartons possessing a high degree of strength and resistance to crushing, particularly under lateral pressure and affording to the "bottles" inserted in their cells a substantial mechanical protection against shocks.

The plastic "cellular cartons"cartons" according to the invention are very inexpensive to manufacture, as they are made by molding of thermoplastic sheets and are so designed as to be readily stacked, when empty, so as to occupy a small space, while when they are inserted in packaging boxes hold the "bottle" inserted in their cells separate from one another and protected from possible reciprocal collisions, even during a rough handling and shipping or transportation.

The molded cellular cartons according to the invention are particularly designed for holding a plurality of rows of "bottles," each row comprising a plurality of bottles, the "plurality" being employed to indicate a number greater than two. Said cellular cartons are characterized by the feature that the peripheral bottle-holding cells, i.e. the cells which, in the packaging boxes remain adjacent to the box walls, extend downwardly so as to protect the bottles to the cell bottoms, on which said bottles rest, thus holding the carton firmly in the packaging box by their own weight, while the inner bottle-holding cells terminate well above the lower end of the said peripheral cells, so as to protect the intermediate "bottle" body against lateral shocks, but without supporting the bottle weight.

According to one preferred embodiment of the invention, the peripheral cells are provided with open or slitted walls at their outer sides and are provided with a bottom sheet on which the bottles rest, while the inner cells are either open at both ends or provided with bottom flaps at a substantial height above the height of the bottoms of the peripheral cells, said bottom flaps of the inner cells being preferably obtained by slitting integral bottom sheets in radial, crosswise or diagonal direction, according to whether the bottoms are circular, oval or polygonal, so that, when a bottle is inserted into the corresponding cell the bottom flaps are pushed elastically apart and folded down against the sides of the lower section of the bottle and act as buffer members preventing the bottle ends from colliding against each other. In case the inner cells are provided with slitted bottoms, they come to be at such a height above the bottom sheets of the peripheral cells, that their flaps, when they are folded down, do not preferably extend beyond the level of the peripheral bottoms.

In one preferred embodiment of the invention, the cells are substantially square at their tops and have circular bottoms and, in order to permit the stacking of the empty cartons by inserting same into one another, the cells are slightly flaring upwardly. On the other hand, the reverse or lower side of the carton is so shaped as to permit its insertion for the most part into the corresponding upward or cellular part of an underlying carton, thus permitting the stacking in a small space of the empty cartons.

Other objects and advantages of the invention will appear from the following specification of one preferred embodiment, which is shown by way of nonlimiting example in the accompanying drawings, wherein:

FIG. 1 is a top plan view showing an embodiment of empty carton according to the invention, designed for the most common case of substantially cylindrical small bottles, the packaging box into which it should be inserted being shown diagrammatically by dotted lines, FIG. 2 is an enlarged top plan view of one corner of the empty carton shown in FIG. 1, and FIG. 3 is a vertical section on line III–III of FIG. 2, through a section of a carton inserted in a packaging box.

Referring now to the drawings, 1 is the carton made from a molded sheet of thermoplastic material and comprising peripheral cells 2 and inner cells 3. In the embodiment as shown, the cells proper 2 and 3 are connected together by the tops of their peripheral upright walls, which in the example as shown, are square and merge into longitudinal ribs 6 and transversal ribs 16 crossing themselves between each four cells 2, 3. Said cells are constituted by substantially upright walls 4, which are at least partly corrugated as shown at 5 and merge into circular bottoms 102, 103.

The peripheral cells 2 are open at their outer sides and have their upright walls extending down to a preferably corrugated bottom 102. The bottoms 102 of the peripheral cells extend outwardly beyond the flaring ends of said ribs 6 and 16 and are connected together so as to form a kind of frame 12 constituted by the margin of the corrugated flat bottom sheet encircling the cellular part of the carton 1. The bottoms 102 have substantially the same shape as that of the bottoms of the bottles B resting thereon.

The inner cells 3 have their upright walls which terminate with bottoms 103 well above the bottoms 102 of the peripheral cells 2. The height of the bottoms 103 above the level of the lower bottoms 102, in case of circular bottoms, is usually equal to the radius of said bottoms.

The bottoms 103 of the inner cells 3 are provided with radial slits 7, which form a number of flaps 8, which, when the inner cells are empty, come to be substantially at right angles to the cell walls, but when a bottle is inserted into said cells, as will be seen hereinafter, the flaps 8 are downfolded into contact with the lower section of the bottle walls and extend with their apices at level with the bottoms 102 of the peripheral cells.

A carton thus obtained by molding a thermoplastic sheet by any conventional vacuum or other deep-forming process, is inserted into a box S, the frame 12 having been previously trimmed so as to fit exactly into said packaging box. With the cartons 1 thus inserted into the boxes S the packaging of the bottles B may be effected by first inserting a bottle B into each of the peripheral cells 2. When the carton is firmly held in place by the weight of the bottles B resting upon the bottoms 102 of the cells 2, the filling of the cartons may be completed by inserting a bottle in each of the inner cells 3, so that the bottle bottom sections depress the bottom flaps 8 of the cells 3, which thus are downfolded against said lower section of the bottles B which rest upon the bottom F of the packaging box S (see FIG. 3).

With a packaging box thus filled with the bottles, the outer cells of the bottles inserted in the peripheral cells 2 project outwardly into contact either with the sidewalls of the packaging box S, or into contact with a buffer sheet which might have been inserted therebetween. This contact of the bottle sides with the sidewalls of the box S (or of the buffer sheets) assists in firmly anchoring the carton 1 to the box S.

From the foregoing it is apparent that a cellular carton has been provided which may be made by a cheap deep-forming method from a plastic sheet, whereby the shape of said carton is such as to permit the stacking of a large number of empty cartons and of manufacturing said cartons with a contour exactly fitting into a packaging box, whereby the rows of peripheral bottles B serve as retaining means for the whole carton into which the bottles inserted in the inner cells rest upon the bottom F of the packaging box S.

It is also apparent that, although in the example as shown the tops of the cells are square and the bottoms circular, it is also possible to have cartons having cells with square bottoms or even having rectangular tops and oval or rectangular bottoms, if the bottles to be inserted are of oval or of square or rectangular cross section. In this case the height of the bottoms 103 of the inner cells 3 above the height of the bottoms 102 of the peripheral cells 2 must be preferably such as to permit the downfolding of the flaps 8 of the inner cells 3 without the apices of said flaps extending beyond the plane of the outer cells 102.

We claim:

1. A cellular carton made of molded plastic and preferably obtained by deep forming of a sheet of thermoplastic material, said carton being designed for inserting into boxes for the packaging of small filled sealed containers or bottles and comprising a plurality of peripheral cells and a plurality of inner cells connected between them and with each other by substantially upright walls merging into connecting ribs crossing themselves between a number of adjoining bottle-holding cells, characterized by the feature that the cell bottoms are shaped like the bottoms of the bottles to be inserted into the cells, the peripheral cell bottoms resting, when inserted in a packaging box, at level with the interior of the box bottom, while the inner cells have their lower ends at a substantial height above the bottoms of the peripheral cells, so that the lower sections of the bottles inserted in the inner cells project outside of the cells proper, and rest upon the bottom of the packaging box in which the carton is inserted.

2. A cellular carton according to claim 1, wherein the bottom of the peripheral cells extend beyond the outer sides of the peripheral cells and form a kind of frame encircling the cellular carton and adapted to be readily trimmed to fit exactly into the packaging box.

3. A cellular carton according to claim 2, wherein the peripheral cells have their sidewalls open towards the exterior of the carton.

4. A cellular carton as claimed in claim 1, wherein the inner cells are provided with bottom flaps including apices which are downfolded by the bottles inserted therein, the height of said bottom flaps above the bottoms of the peripheral cells being such that when the flaps are downfolded, their apices extend substantially not beyond the level of the bottoms of the peripheral cells.

5. A cellular carton as claimed in claim 1 wherein the cells are substantially rectangular at their tops and their bottoms have a substantially nonangular shape.

6. A cellular carton according to claim 5, wherein the tops of the cells are substantially square and the bottoms are substantially circular.